United States Patent [19]
Montgomery

[11] 3,951,564
[45] Apr. 20, 1976

[54] PIPE OR TUBE CUTTER FOR HAND DRILLS

[76] Inventor: George R. Montgomery, 1152 Okeechobee Road, West Palm Beach, Fla. 33401

[22] Filed: Nov. 1, 1974

[21] Appl. No.: 520,126

[52] U.S. Cl. .................................. 408/29; 10/87; 10/110; 83/488; 408/87; 408/125
[51] Int. Cl.² .................. B23D 21/04; B23D 81/00
[58] Field of Search .............. 408/28, 29, 125, 124, 408/87, 21, 22, 26; 30/500, 90.3, 102; 10/87, 90, 110, 1 R; 83/488; 144/35 R, 205

[56] References Cited
UNITED STATES PATENTS

| | | | |
|---|---|---|---|
| 1,490,597 | 4/1924 | Darabos | 83/488 |
| 2,195,568 | 4/1940 | Hexdall | 408/28 |
| 3,313,193 | 4/1967 | Orendi | 83/488 |
| 3,315,554 | 4/1967 | Jaeyers | 83/488 |

Primary Examiner—Travis S. McGehee
Assistant Examiner—Z. R. Bilinsky
Attorney, Agent, or Firm—D. Paul Weaver

[57] ABSTRACT

A right angular gear drive attaches directly to an electric hand drill following removal of the drill chuck. A power-operated tube cutter and burr remover are driven directly by the output shaft of the gear drive. A slide is fixed to the gear drive immediately rearwardly of the cutter element and is received within a guide and cover member which may be engaged with a floor or work bench during use. Spring means returns the guide and cover member to its original position after use.

4 Claims, 5 Drawing Figures

PIPE OR TUBE CUTTER FOR HAND DRILLS

BACKGROUND OF THE INVENTION

A need exists for a simplified and economical cutter attachment for electric hand drills enabling the same to be used conveniently to cut electrical conduit, copper tubing and the like, on the job site. While devices for this purpose have been proposed in the prior art, no completely satisfactory structure for this purpose has been made available. Generally speaking, the prior art devices are too complex, heavy and costly to be adopted by the trade or by home users of similar tools and therefore, in the final analysis, the prior art devices are not completely practical.

With the above in view, the objective of the invention is to provide a tubing cutter attachment for hand drills which is economical to manufacture, convenient to use, lightweight and compact, and readily installable on conventional electric hand drills without altering the structure of the latter or interfering with the normal use of the drill.

Another important object of the invention is to provide a power-operated deburring element on the cutter attachment which enables internal tube burrs formed by cutting the tube to be readily removed.

Other features and advantages of the invention will become apparent during the course of the following description.

Some examples of the patented prior art over which the invention is an improvement are U.S. Pat. Nos. 1,677,922, Kasztler; 2,973,576, Hentke; and 3,449,992, Hanaway.

BRIEF DESCRIPTION OF DRAWING FIGURES

DETAILED DESCRIPTION

Figure 1:
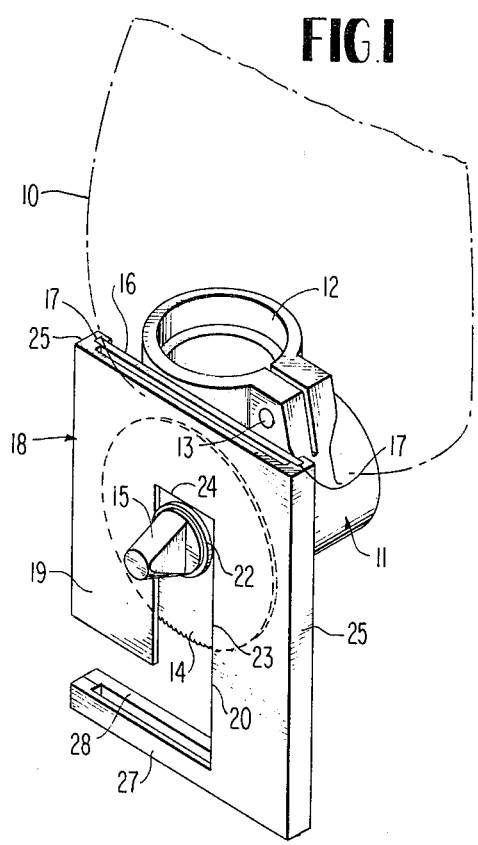
FIG. 1 is a perspective view of a tubing cutter attachment for drills embodying the invention.

Referring to the drawings in detail wherein like numerals designate like parts, the numeral 10 designates the drill holding portion or motor housing of a conventional electric hand drill from which the drill chuck has been removed in order to accommodate the invention. The details of the hand drill are unimportant and form no part of the present invention and therefore are omitted from the drawings. In this connection, the invention is readily adaptable to a variety of electric drills now on the market and thus is quite versatile.

The invention proper comprises a right angular gear drive unit 11, also of conventional construction, and being readily available on the market. The gear drive unit 11 has a split collar 12 adapted to be clamped directly to the drill 10 against a shoulder thereof. A clamping screw 13 is provided on the unit 11 for this purpose. An internal threaded shaft of the gear drive unit 11, not shown, is coupled within an internally threaded shaft of the electric drill, not shown, in a well-known manner so as to connect the drive 11 to the rotary shaft of the drill. The output shaft of the gear drive unit 11 extending at right angles to the drill spindle carries a rotary thin circular cutter or saw blade 14 of substantial diameter. In some instances, a smooth circular blade may be utilized in lieu of the saw blade shown. Also coupled to the output shaft of gear drive unit 11 immediately ahead of tube cutter blade 14 is a tapered tube deburring element 15 whose use will be further described.

Attached directly to the gear drive unit 11 as by welding or the like is a relatively thin flat rectangular plate or slide 16, and this slide lies immediately rearwardly of the cutter blade 14 in closely spaced parallel relation thereto. Opposite edge portions of the slide 16 are received in opposing parallel grooves 17 of a combined guide and guard member 18. The member 18 has a frontal cutter guard plate 19 disposed close to the forward face of the cutter blade and this plate has a large L-slot 20 formed therein for the reception of tubing 21 to be cut by the attachment. The deburring element 15 projects forwardly of the plate 19, as shown. An enlarged washer 22 on the output shaft of the right angular drive 11 is disposed in the vertical portion 23 of the L-shaped slot 20 and is adapted to abut the top edge 24 of the slot to limit downward movement of the member 18 relative to the unit 11 and drill 10 on which the invention is mounted. The two guide grooves 17 for the slide 16 are formed in opposing rearwardly projecting bar portions 25 of guide and guard member 18. The lower end of the thin slide 16 has a clearance slot 26 formed therein to receive the tubing 21 during the cutting operation depicted in FIG. 3 of the drawings.

Figure 2:
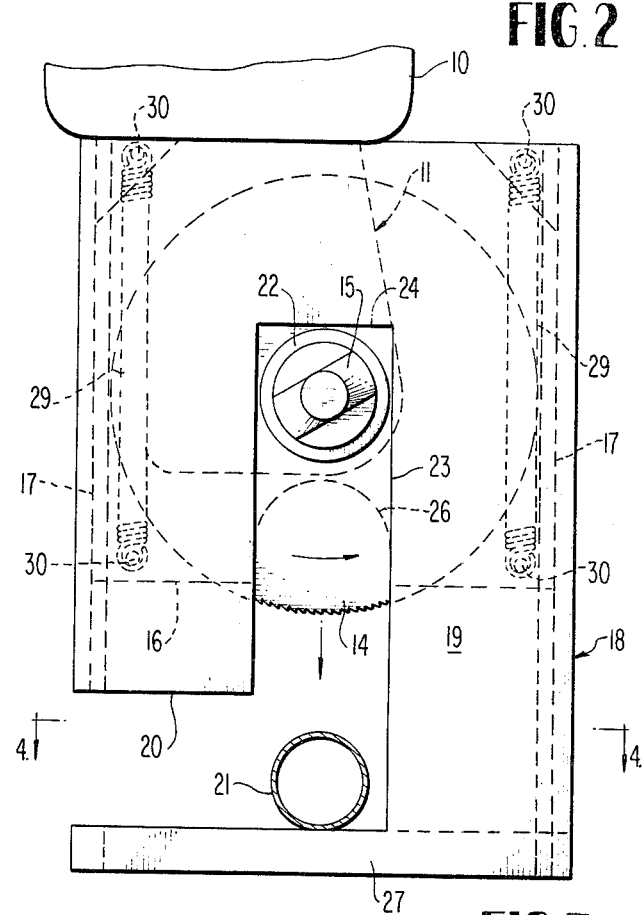
FIG. 2 is an enlarged side elevational view of the invention.
Figure 3:
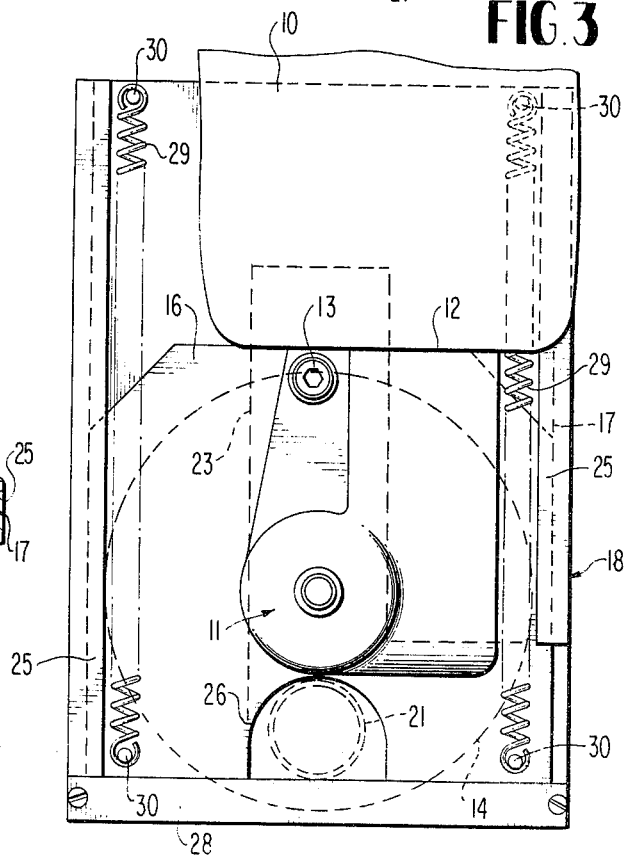
FIG. 3 is an opposite side elevational view.

At its lower end, the member 18 has a floor or bench engaging bar 27 having a lower straight edge so that the user of the invention may place the member 18 in engagement with a solid surface, such as a floor, when cutting the tubing 21, while the latter is resting on the bar 27, FIGS. 2 and 3. An optional feature of the invention shown in the drawings prevents the cutter or saw 14 from nicking a floor or work bench after passing through the tubing 21. This feature comprises a detachable stop bar 28 for the lower edge of slide 16 and positioned to be engaged by the slide so as to limit its downward movement with the cutter 14 to the position shown in FIG. 3, wherein the cutter is slightly above the floor or work bench. If preferred, in some instances, the device may be used without the stop bar 28.

During use, to sever the tubing 21 or like material, after the tubing has been placed within the slot 20 and the bottom of the member 18 engaged with a solid surface, the user bears down on the hand drill 10 with the motor in operation and the cutter 14 revolving. After passage of the cutter through the tubing, FIG. 3, and lifting of the drill, the guide and guard member 18 will be returned to its normal position shown in FIGS. 1 and 2 by a pair of return springs 29 or equivalent spring means. In the embodiment shown, a pair of retractile coil springs have their opposite ends attached at 30 near the lower end of slide 16 and near the top of the guide and guard member 18. Other forms of return spring means for the member 18 may be utilized in the invention.

Figure 5:
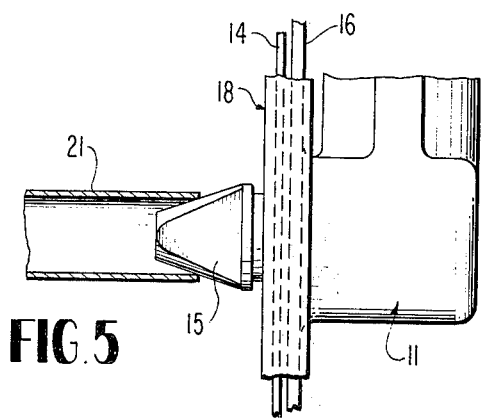
FIG. 5 is a fragmentary side elevation of the invention showing the operation of the power-driven tube deburring element.
Figure 4:
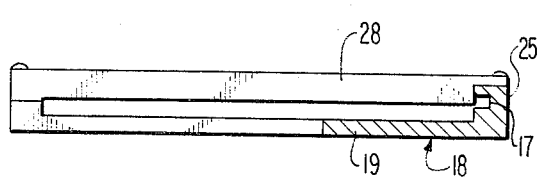
FIG. 4 is a horizontal section taken on line 4—4 of FIG. 2.

Referring to FIG. 5, after the tube severing operation is completed, any internal burrs on the tubing 21 are readily removed by placing the end of the severed tube over the rotating burr removing element 15 while the drill motor is still in operation.

It may now be seen that the tubing cutter and deburring attachment for electric hand drills is characterized by extreme simplicity and compactness. It embodies a minimum number of parts rendering the device virtually maintenance-free and fool-proof in operation. The attachment is lightweight and therefore easy to manipulate by hand when attached to the drill 10. It constitutes a single unit in assembly with no parts requiring separate handling during use. It is believed that the advantages of the invention over the prior art, particularly in terms of simplicity and economy of manufacture, are now readily apparent.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A tube cutter attachment for a portable hand drill having a drill spindle, said attachment comprising a right angular drive unit including means for clamping said unit to the hand drill and having an output shaft extending at right angles to the axis of the hand drill spindle, a tubing cutter blade secured to said output shaft and rotating therewith in a plane perpendicular to the axis of the output shaft, a slide plate fixedly secured to said right angular drive unit immediately rearwardly of the tubing cutter blade and having a pair of spaced parallel straight edges, and an integral guide and guard means for said slide plate, said integral guide and guard means including cutter blade guard and a work rest means, said integral guide and guard means being of plate-like formation and having side opposing grooves receiving said straight edges guidingly and having an L-shaped slot opening through one side edge to receive tubing, there being a bottom tubing rest bar on the bottom of the integral guide and guard means defining the bottom edge of said slot and adapted to engage a solid surface, said cutter blade guard being disposed immediately forwardly of said cutter blade to guard the same in all adjusted positions of the cutter blade except in the area defined by said slot, and spring return means disposed between said integral means and said unit for biasing said unit away from said rest bar.

2. The structure of claim 1, and said spring return means comprising at least one retractile spring interconnecting the integral guide and guard means and said slide plate.

3. The structure of claim 1, and a rotary deburring element secured to said output shaft forwardly of said tubing cutter blade and projecting forwardly of the integral guide and guard means and through said slot.

4. The structure of claim 1, and a fixed stop bar on the lower end of the integral guide and guard means immediately adjacent and parallel to said rest bar for limiting downward travel of said slide plate relative to the integral guide and guard means, the top of said L shaped slot forming a stop limiting relative movement of the slide plate and integral guide and guard means in the reverse direction.

* * * * *